(12) United States Patent
Boedi et al.

(10) Patent No.: US 8,036,927 B2
(45) Date of Patent: Oct. 11, 2011

(54) METHOD FOR STOCK KEEPING, COMPUTER SYSTEM AND COMPUTER PROGRAM

(75) Inventors: Richard Boedi, Waedenswil (CH); Peter Korevaar, Meckesheim (DE); Ulrich Schimpel, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 12/146,425

(22) Filed: Jun. 25, 2008

(65) Prior Publication Data

US 2008/0288334 A1   Nov. 20, 2008

(30) Foreign Application Priority Data

Jun. 29, 2007  (EP) .................................. 07111395

(51) Int. Cl.
*G06Q 10/00* (2006.01)
(52) U.S. Cl. ...................... 705/7.25; 705/7.11; 705/7.12
(58) Field of Classification Search .................... 705/10, 705/7.11–7.42
See application file for complete search history.

(56) References Cited

U.S. PATENT DOCUMENTS

| | | | | | |
|---|---|---|---|---|---|
| 5,819,232 | A | * | 10/1998 | Shipman | 705/7.24 |
| 6,151,582 | A | * | 11/2000 | Huang et al. | 705/7.25 |
| 6,205,431 | B1 | * | 3/2001 | Willemain et al. | 705/7.25 |
| 2002/0143669 | A1 | * | 10/2002 | Scheer | 705/28 |
| 2003/0078819 | A1 | * | 4/2003 | Hoffman et al. | 705/7 |
| 2005/0288993 | A1 | * | 12/2005 | Weng et al. | 705/10 |
| 2006/0085244 | A1 | * | 4/2006 | Foerster et al. | 705/8 |
| 2006/0106664 | A1 | * | 5/2006 | Peters et al. | 705/10 |
| 2006/0136237 | A1 | * | 6/2006 | Spiegel et al. | 705/1 |
| 2006/0247939 | A1 | * | 11/2006 | An et al. | 705/1 |

OTHER PUBLICATIONS

Ardalan, Alireza. A comparative analysis of approaches for determining optimal price and order quantity when a sale increases demand. European Journal of Operational Research. v84n2 pp. 416-430, Jul. 20, 1995.*

* cited by examiner

*Primary Examiner* — Jason B Dunham
*Assistant Examiner* — Richard Scheunemann
(74) *Attorney, Agent, or Firm* — Gail H. Zarick; Otterstedt, Ellenbogen & Kammer, LLP

(57) ABSTRACT

The present invention relates to a method, computer system and computer program for stock keeping. An embodiment of the invention determines forecast values of quantities to be consumed of a stock keeping unit for at least two different forecast time spans depending on a historical consumption data. The invention further determines order values of order quantities for each forecast value depending on a respective forecast value, stock keeping costs and ordering costs. The invention further determines an associated order quantity time span for each order value. The invention further determines a respective pair of forecast value and order value with the least deviation between forecast time span and order quantity time span from forecast values, forecast values respective forecast time spans, the order values and the order values respectively associated with order quantity time spans. The invention further processes the determined pair of forecast value and determined order value.

10 Claims, 3 Drawing Sheets

METHOD FOR STOCK KEEPING, COMPUTER SYSTEM AND COMPUTER PROGRAM

CROSS-REFERENCE TO RELATED APPLICATIONS

This application claims priority under 35 U.S.C. §119 to Eurpoean Patent Application No. 07111395 filed Jun. 29, 2007, the entire contents of which is incorporated herein by reference.

FIELD OF THE INVENTION

The present invention relates to stock keeping. More specifically, the present invention relates to a method, system, and computer program for stock keeping.

BACKGROUND OF THE INVENTION

Large warehouses may stock up to, for example, 200,000 different stock keeping units. Each of these stock keeping units may have very different characteristics concerning their size, needs for being properly stocked, their time for consumption and other influencing factors. An inventory management of such a warehouse is highly complex and therefore creates the desire for computer implemented inventory management.

Collaborative planning, forecasting and replenishment (CPFR) aims to enhance the supply chain integration by supporting and assisting joint practices. Joint visibility and replenishment of products throughout the supply chain shall contribute to cooperative management of inventory. Information shared between suppliers and retailers aids in planning and satisfying customer demands through a supportive system of shared information. In this way end-to-end supply chain processes are made more efficient and CPFR allows for the continuous updating of inventory and upcoming requirements.

It is a challenge to provide a method, computer system and computer program for stock keeping which improves stock keeping under the prerequisite of reasonable use of calculating power resources.

SUMMARY OF THE INVENTION

An exemplary feature of an embodiment of the present invention is a method for stock keeping. The method for stock keeping consists of determining forecast values of quantities to be consumed of a given stock keeping unit for at least two different forecast time spans depending on a historical consumption data. The method further consists of determining order values of order quantities for each of the forecast value depending on a respective forecast value, stock keeping costs and ordering costs. The method further consists of determining an associated order quantity time span for each the order value. The method further consists of determining a respective pair of the forecast value and the order value with least deviation between the forecast time span and the order quantity time span from the forecast values and the forcast values respective forecast time spans and from the order values and the order values respectively associated order quantity time spans. The method further consists of processing the determined pair of the forecast value and the determined order value.

Another exemplary feature of an embodiment of the present invention is a computer system. The computer system consists of a computing unit operable to determine forecast values of quantities to be consumed of a given stock keeping unit for at least two different forecast time spans depending on a historical consumption data. The computer system further consists of a computing unit operable to determine order values of order quantities for each of the forecast value depending on a respective forecast value, stock keeping costs and ordering costs. The computer system further consists of a computing unit operable to determine an associated order quantity time span for each said order value. The computer system further consists of a computing unit operable to determine a respective pair of the forecast value and the order value with least deviation between the forecast value and the order value forecast time span and order quantity time span from the forecast values and the forcast values respectively associated forecast time span and from the order values and the order values respectively associated order quantity time spans. The computer system further consists of a computing unit operable to process the determined forecast value and the determined order value.

Another exemplary feature of an embodiment of the present invention is a computer program product consisting of a computer useable medium including a computer readable program, wherein the computer readable program when executed on a computer causes the computer to perform the method steps for stock keeping. The computer program product consists of the step of determining forecast values of quantities to be consumed of a given stock keeping unit for at least two different forecast time spans depending on a historical consumption data. The computer program product further consists of the step of determining order values of order quantities for each of the forecast value depending on a respective forecast value, stock keeping costs and ordering costs. The computer program product further consists of the step of determining an associated order quantity time span for each order value. The computer program product further consists of the step of determining a respective pair of the forecast value and the order value with least deviation between their associated forecast time span and the order quantity time span The computer program product further consists of the step of processing the determined pair of the forecast value and the determined order value.

Various other features, exemplary features, and attendant advantages of the present disclosure will become more fully appreciated as the same becomes better understood when considered in conjunction with the accompanying drawings, in which like reference characters designate the same or similar parts throughout the several views.

BRIEF DESCRIPTION OF THE DRAWINGS

The figures form a part of the specification and are used to describe the embodiments of the invention and explain the principle of the invention together with the literal statement. The foregoing and other objects, aspects, and advantages will be better understood from the following non-limiting detailed description of preferred embodiments of the invention with reference to the drawings, wherein.

The figures are illustrating.

DETAILED DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings.

Figure 1:
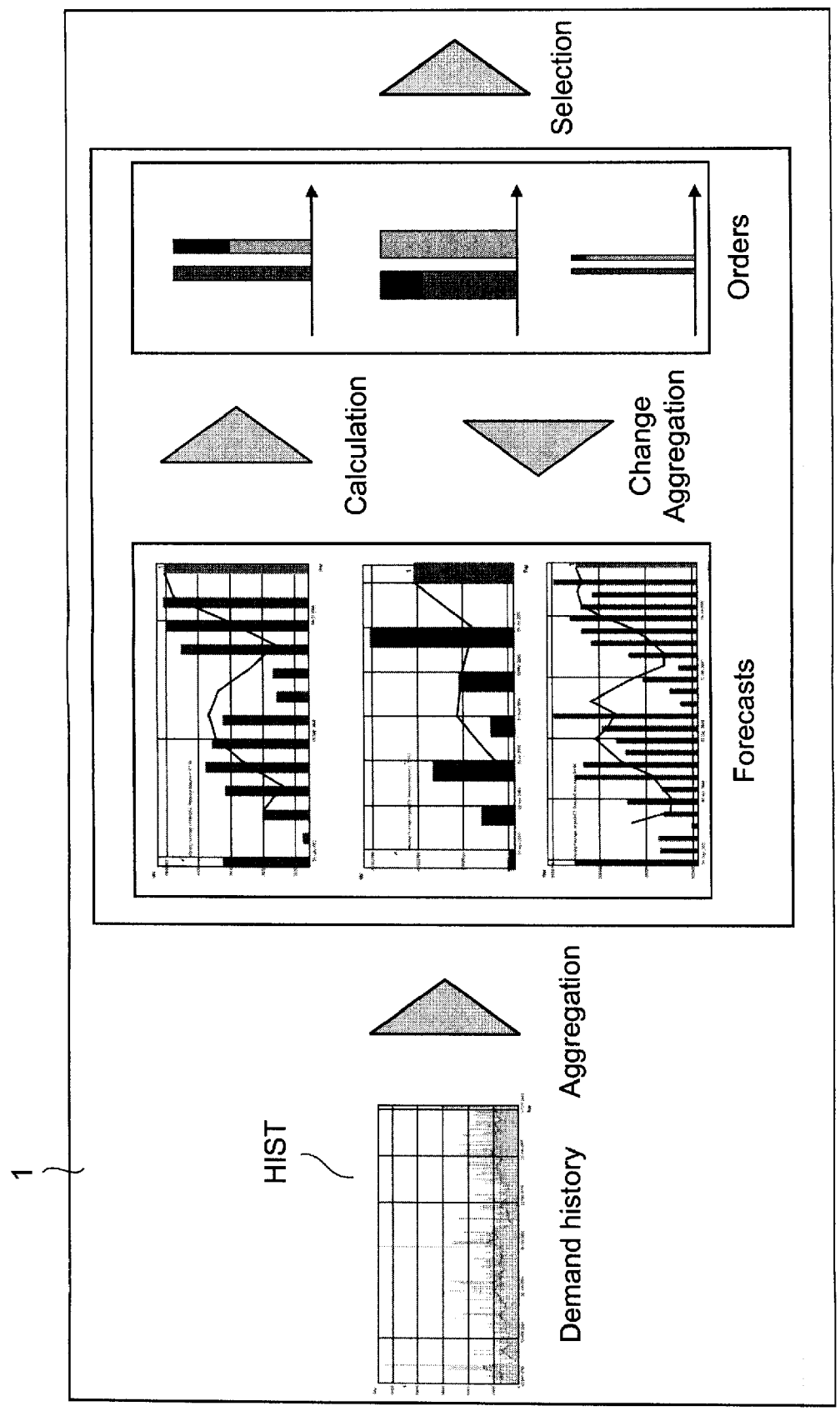
FIG. 1, a computer system,
FIG. 2, a flowchart for stock keeping,
FIG. 3 an illustration of a stock keeping control system according to an embodiment of the invention.

A computer system 1 (FIG. 1) comprises a storage unit for storing program instructions and for storing data. It further comprises a processing unit for processing the program instructions and the data. It further comprises an outputting interface which may comprise a screen for displaying information or also an interface being operable to provide data for further processing.

In the storage unit, historical consumption data HIST being associated to a particular stock keeping unit are stored. They may be broken down on a given time basis, like a day basis. They may, for example, comprises historical consumption data over a duration of time of, for example, a year or two or only several months.

At least two forecast time spans FC_TS are provided which are different from each other. The computer system is preferably adapted to aggregate the historical consumption data HIST, possibly taking into consideration further influencing factors like an advertising influence over the at least two different forecast time spans FC_TS in order to receive forecast values FC of quantities to be consumed.

The computer system is further adapted to determine order values OQ of order quantities for each forecast value FC depending on the respective forecast value FC, stock keeping costs SKC and ordering costs OC. The computer system is further adapted to determine for each order value OQ an associated order quantity time span OQ_TS and to determine from the forecast values FC and their respectively associated forecast time spans FC_TS and from the order values OQ and their respectively associated order quantity time spans OQ_TS the respective pair PA of forecast value FC and order value OQ with the least deviation between their associated forecast time span FC_TS and quantity time span OQ_TS and to provide the determined pair PA for outputting or further processing. The outputting may be on the screen being associated to the computer system or also on an interface being operable to automatically provide the pair for other units to further process them. The pair may also be further processed within the computer system. The further processing may comprise to initiate respective orders of respective order quantities at given points of time.

Figure 2:
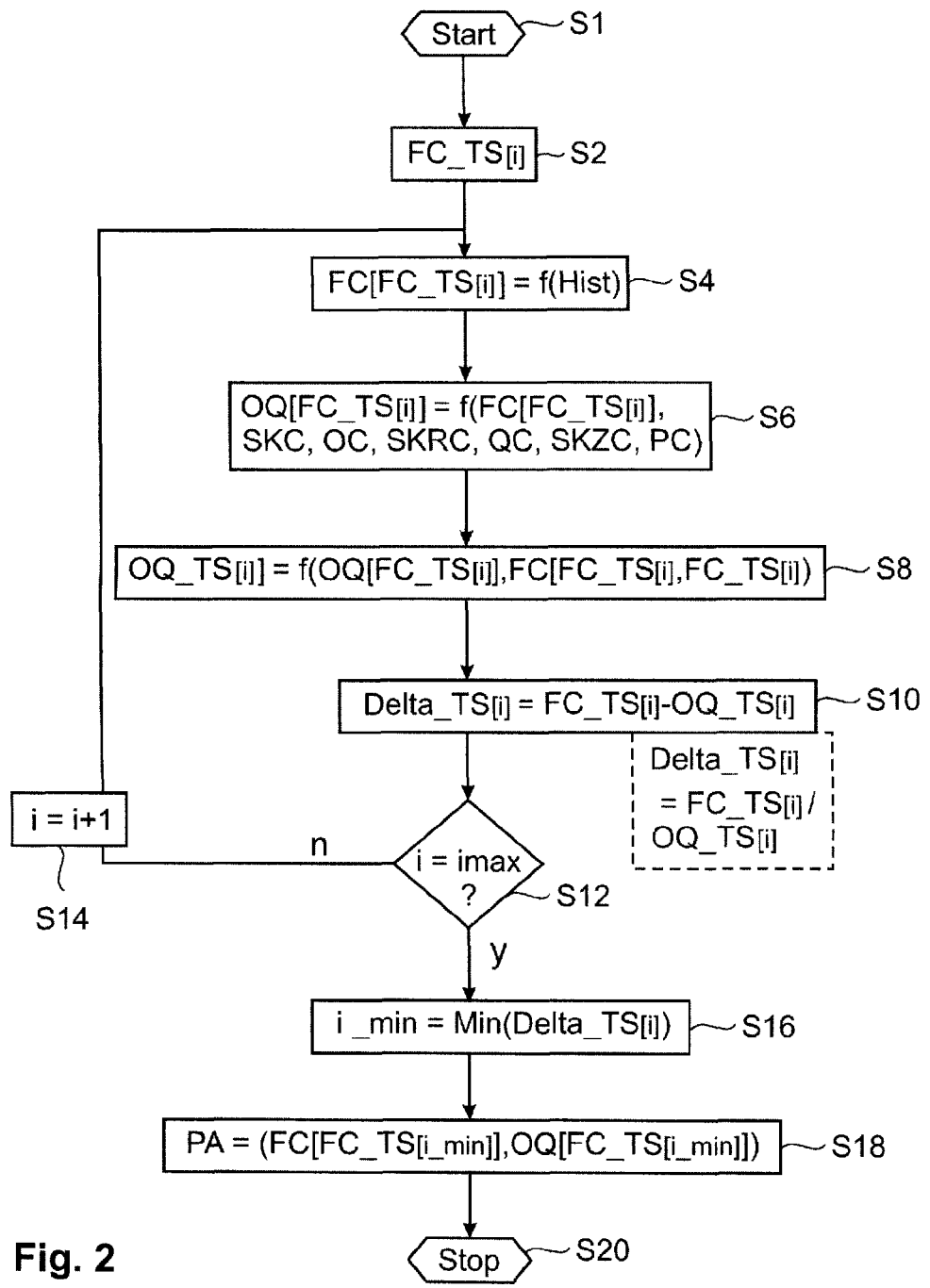

FIG. 2 is a flowchart of a program with respective program instructions that may be executed in the computer system 1. The program, being a computer program, may be stored on a computer readable medium which may, for example, may be a hard disk, a memory stick, a memory card, an optical disk or some other computer readable medium known to the person skilled in the art.

In a step S1 the program is started and parameters may be initialized. In a step S2 different, but at least two, forecast time spans FC_TS, each of which is characterized by index i are provided. They may be stored on the storage unit or may be inputted via an input interface of the computer system. The forecast time spans FC_TS[i] may, for example, be a day, a week and a month or a day, two days, a week, a month, three-months, a year. They may however, also be any other combination and may be provided in an amount of two, but also much more than two, different forecast time spans FC_TS.

In a step S4 a forecast value FC of quantities to be consumed within the respective forecast time span FC_TS[i] is determined for each stock keeping unit dependent on the historical consumption data HIST and preferably taking into consideration other influencing factors like whether the respective stock keeping unit is currently advertised and possibly whether it is advertised with a picture or without a picture. The determination may be based on an accumulation of the historical data HIST associated to the currently given forecast time span $FC_{13}TS[i]$ being in relation to the currently given forecast time span by e.g. the past year. Also further time durations may be taken into consideration possibly by weighing respective historical data in a predefined way. The time duration concerning the accumulation of the historical data may deviate from the forecast time span. In this respect the time duration may be a fraction or a multiple of the forecast time span.

In a step S6 an order value OQ of order quantities associated to the respective forecast time span FC_TS[i] is determined depending on the forecast value FC of quantities to be consumed associated to the respective forecast time span FC_TS[i], given stock keeping costs SKC and given ordering costs OC. It may also be determined depending on stock receipt costs SKRC, which are also given and may represent costs involved with the receipt of the respective stock keeping unit SKU. It may further be determined depending on quality control costs QC, representing costs for a necessary quality control of the respective stock keeping unit. It may further be determined depending on stock zone costs SKZC which represent costs associated to a respective stock zone and may be different for a small packet versus a pallet. Order values OQ may further be determined depending on packaging costs PC being involved with packaging or unpacking the respective stock keeping unit.

In a step S8 an order quantity time span OQ_TS[i] associated to the order value OQ for the respective forecast time span FC_TS[i] is calculated depending on the respective forecast time span FC_TS[i], the respective order value OQ associated to the respective forecast time span FC_TS[i] and the forecast value FC associated to the respective forecast time span FC_TS[i]. In this respect preferably the respective forecast value FC is interpolated, in particular linearly interpolated, over the respective forecast time span FC_TS[i] and is then transformed into a function having as input the respective order value OQ and having as output the order quantity time span OQ_TS. In a step S10, a deviation DELTA_TS for the current data set represented by the index i is calculated. This may be achieved by way of subtracting the order quantity time span OQ_TS from the forecast time span FC_TS or by dividing the forecast time span FC_TS by the order quantity time span OQ_TS. In a step S12 it is determined whether the index i has reached a given index maximum value i_max representing the amount of different forecast time spans FC_TS. If the condition of step S12 is not fulfilled, then in a step S14 the index i is incremented and the program continues in step S4. If, however, the condition of step S12 is fulfilled then in a step S16 the index i_min with the least deviation DELTA_TS is determined. In the case when the deviation DELTA_TS is determined by subtracting the respective forecast time span FC_TS[i] and the respective order quantity time span OQ_TS[i] a minimum function may be applied to all the deviation values DELTA_TS determined while processing step S10 for each value of index i.

In the case when the deviation DELTA_TS is determined by forming the quotient of the forecast time span FC_TS[i] and the order quantity time span OQ_TS[i] the index i_min with the least deviation DELTA_TS is determined by which of the values are closest to the value of 1.

In a step S18 the respective pair PA of forecast value FC and order value OQ associated to the index i_min corresponding to the minimal deviation determined in step S16 is determined and is then provided for further processing or outputting. The program is then terminated in a step S20.

Figure 3:
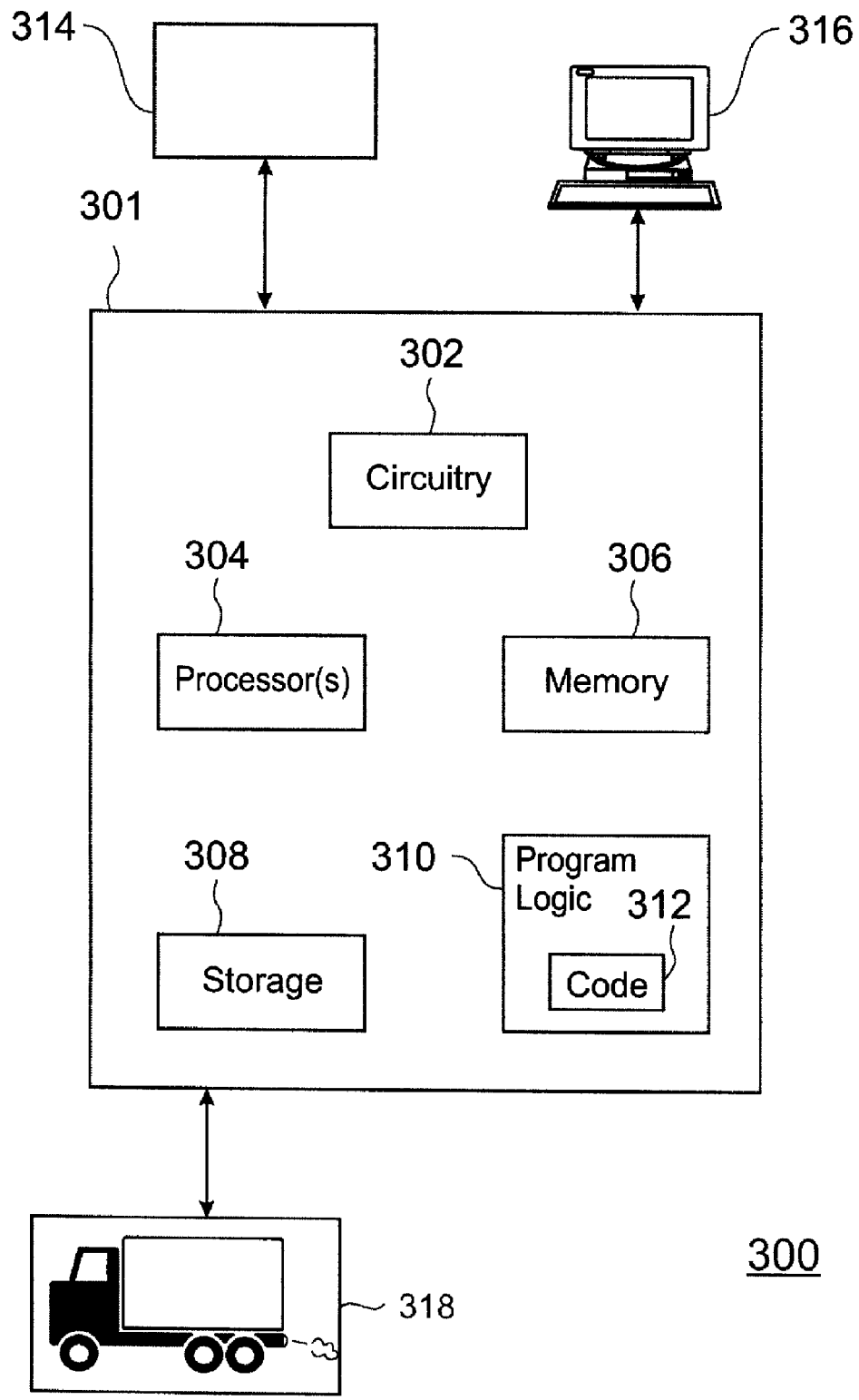

FIG. 3 shows a more detailed illustration of a stock keeping control system embodying the invention. The stock keeping control system 300 comprises a computer system 301. The computer system 301 may include circuitry 302, one or more processors 304, memory 306 (e.g., a volatile memory device) and storage 308.

The storage 308 may include a non-volatile memory device, magnetic disk drive, optical disk drive, tape drive etc. The computer system 301 may include a program logic 310 including program code 312 that may be loaded into the memory 306 and executed by the processor 304 or the circuitry 302.

The stock keeping control system 300 comprises one or more stock keeping units 314 being provided for sending input data to the computer system 301. The input data may comprise in particular historical consumption data of the respective stock keeping unit. The input data may further comprise e.g. forecast time spans (FC_TS), stock keeping costs (SKC) and ordering costs (OC). The input data may be stored in the storage unit 308. The computer system 301 is provided for processing the input data received from the stock keeping unit 314 and for determining a pair of forecast value (FC) and order value (OQ) with the least deviation between their associated forecast time span (FC_TS) and order quantity time span (OQ_TS) as described with reference to FIG. 2. The computer system 301 is further adapted for outputting a determined pair to a display unit 316. Furthermore, the stock keeping control system 300 comprises an automatic order unit 318 being adapted for initiating respective orders of respective order quantities at given points of time. The respective orders of respective order quantities are based on the determined pair.

The disclosed embodiments may be combined with one or several of the other embodiments shown and/or described. This is also possible for one or more features of the embodiments.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed. Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Furthermore, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer system, comprising:
   a computing unit operable to determine forecast values of quantities to be consumed of a given stock keeping unit for at least two different forecast time spans depending on a historical consumption data;
   a computing unit operable to determine order values of order quantities for each said forecast value depending on a respective forecast value, stock keeping costs and ordering costs;
   a computing unit operable to determine an associated order quantity time span for each said order value;
   a computing unit operable to determine a respective pair of said forecast value and said order value with least deviation between their associated forecast time span and order quantity time span; and
   a computing unit operable to process said determined forecast value and said determined order value.

2. The computer system of claim 1 wherein the computing unit operable to process said determined forecast value and said determined order value comprises an automatic order unit configured to initiate orders of respective order quantities.

3. The computer system of claim 2, further comprising:
   a storage unit for storing the historical consumption data.

4. The computer system of claim 2, wherein the computing unit operable to determine the associated order quantity time span for each order value is configured to calculate the order quantity time span depending on the respective forecast time span, the respective order value associated to the respective forecast time span, and the forecast value associated to the respective forecast time span.

5. A computer program product comprising a non-transitory computer useable medium including a computer readable program and a non-transitory storage unit, wherein said computer readable program when executed on a computer causes the computer to perform a method for stock keeping comprising:
   storing historical consumption data relating to a stock keeping unit in the non-transitory storage unit;
   determining forecast values of quantities to be consumed of a given stock keeping unit for at least two different forecast time spans depending on the historical consumption data;
   determining order values of order quantities for each said forecast value depending on a respective forecast value, stock keeping costs and ordering costs;
   determining an associated order quantity time span for each said order value;
   determining a respective pair of said forecast value and said order value with least deviation between their associated forecast time span and said order quantity time span; and
   processing said determined pair of said forecast value and said order value.

6. The computer program product of claim 5, further comprising:
   initiating respective orders of respective order quantities.

7. The computer program product of claim 5, further comprising:
   determining said least deviation based on a difference between said forecast time span and said order quantity time span.

8. The computer program product of claim 6, further comprising:
   determining said least deviation based on a quotient of said forecast time span and said order quantity time span.

9. The computer program product of claim 5, further comprising:
   determining said associated order quantity time span dependent on a linear interpolation of said forecast value over said respective forecast time span for each said order value.

10. The computer program product of claim 6, further comprising:
    determining said associated order quantity time span dependent on a linear interpolation of said forecast value over said respective forecast time span for each said order value.

* * * * *